Figures 1, 2:
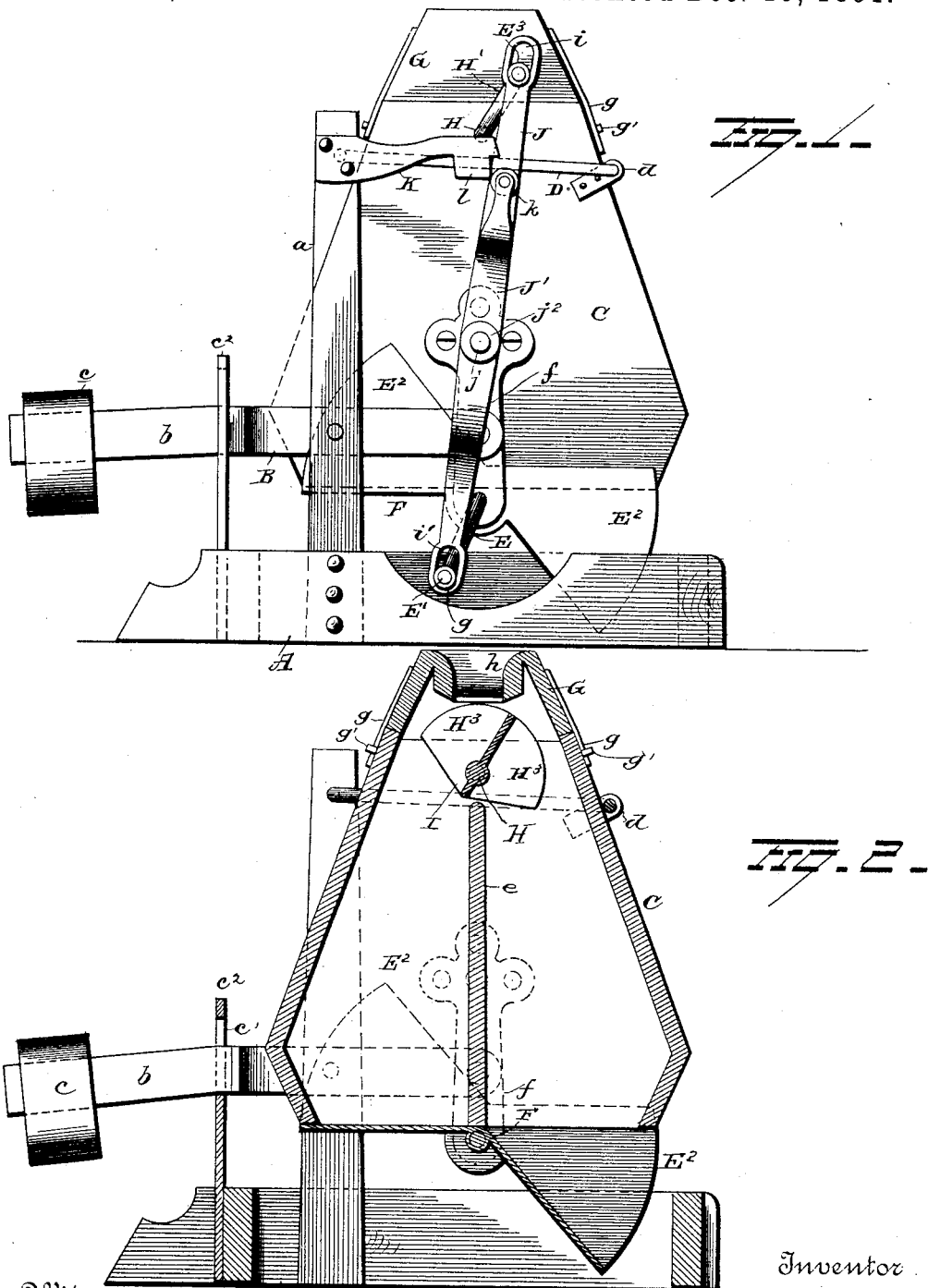

(No Model.) 3 Sheets—Sheet 1.

A. J. NEVILLE.
GRAIN WEIGHER.

No. 465,025. Patented Dec. 15, 1891.

Witnesses
C. J. Nottingham
G. F. Downing

Inventor
Albert J. Neville
By H. A. Seymour
Attorney (No Model.) 3 Sheets—Sheet 2.
A. J. NEVILLE.
GRAIN WEIGHER.
No. 465,025. Patented Dec. 15, 1891.
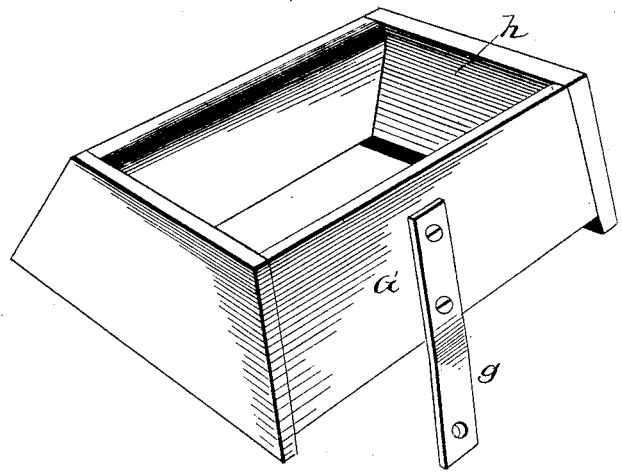
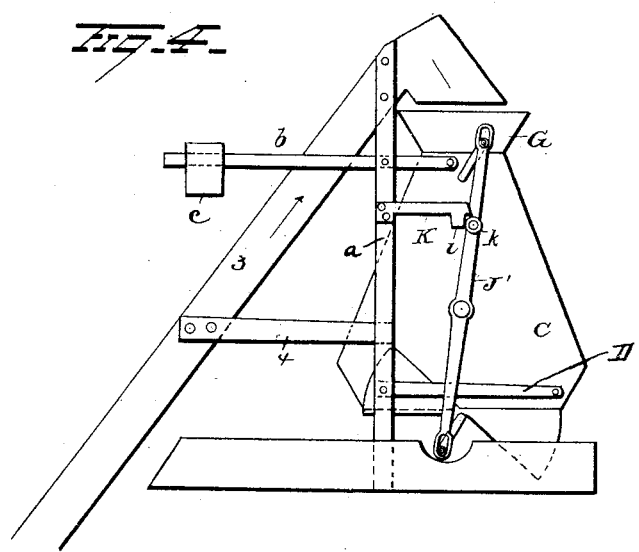
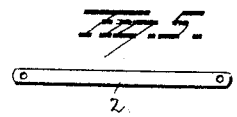
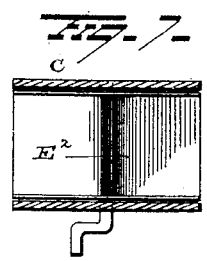
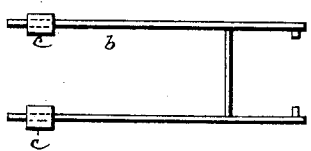
Witnesses
P. J. Nottingham
G. F. Downing
Inventor
Albert J. Neville
By H. A. Seymour
Attorney

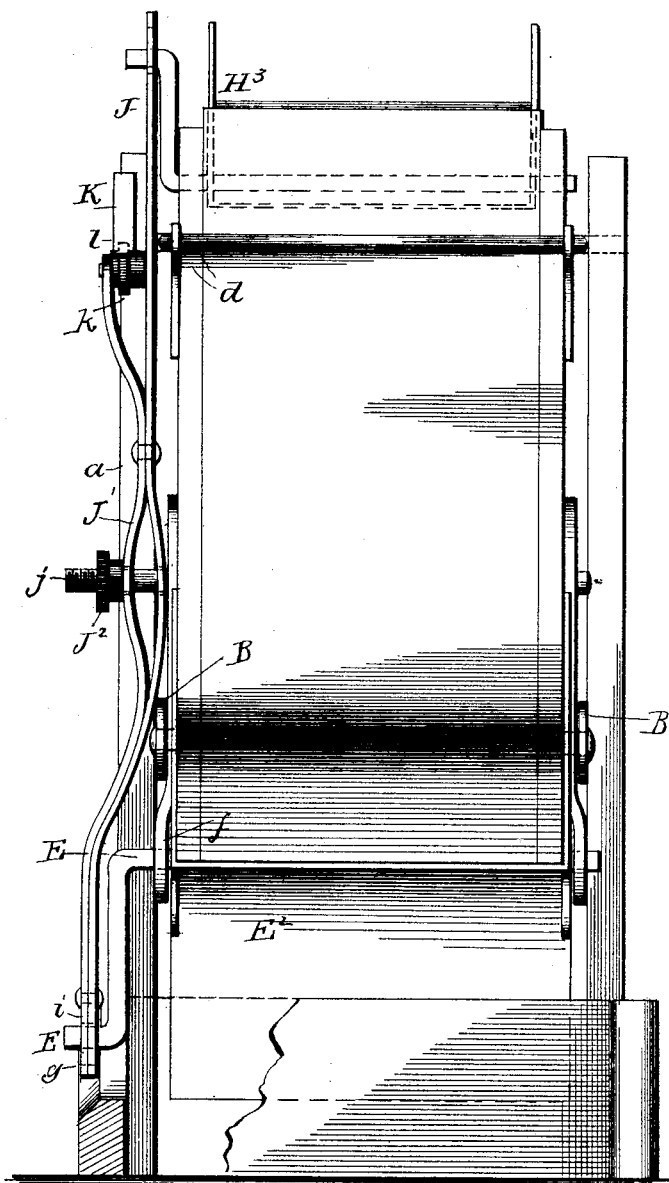

UNITED STATES PATENT OFFICE.

ALBERT J. NEVILLE, OF CANTON, ILLINOIS.

GRAIN-WEIGHER.

SPECIFICATION forming part of Letters Patent No. 465,025, dated December 15, 1891.

Application filed March 4, 1891. Serial No. 383,749. (No model.)

*To all whom it may concern:*

Be it known that I, ALBERT J. NEVILLE, a citizen of Canton, in the county of Fulton and State of Illinois, have invented certain new and useful Improvements in Grain-Meters; and I do hereby declare the following to be a full, clear, and exact description of the invention, such as will enable others skilled in the art to which it appertains to make and use the same.

My invention relates to an improvement in grain-meters, its object being to produce a grain-meter so supported and constructed that it shall be simple, comprising a small number of parts, and which shall be sure and effective in the performance of its functions.

A further object is to produce an improved trip mechanism for a grain-meter which shall act automatically to control the valves and cut-off.

A further object is to construct a grain-meter in such a manner that there will be no liability of the grain being weighed getting between the operating parts and thus choking the mechanism.

A further object is to so construct a grain-meter that the valves and cut-off shall be automatically operated through the medium of a single operating-lever.

With these objects in view the invention consists in the combination, with a pivoted hopper having valves at its bottom and a cut-off at its top, of a lever pivoted to said hopper, said lever being connected at one end with the valves and at the other end with the cut-off and an arm with which said pivoted lever is adapted to engage.

It also consists in the combination, with a pivoted hopper, of crank-shafts mounted in said hopper at or near its top and bottom, respectively, valves connected to one of said crank-shafts, a cut-off connected to the other crank-shaft, a lever pivoted to the hopper, said pivoted lever being connected at its ends with said crank-shafts, and a rigid arm or stop with which said pivoted lever is adapted to engage.

The invention also consists in the combination, with suitable uprights or supports, of a weighted yoke pivoted thereto, a hopper pivoted in the ends of said yoke, crank-shafts mounted in the top and bottom of said hopper, valves carried by one of said crank-shafts and a cut-off carried by the other crank-shaft, and a rigid arm or stop carried by the upright or support and adapted to be engaged by said pivoted lever.

The invention further consists in certain novel features of construction and combinations and arrangements of parts, as hereinafter set forth, and pointed out in the claims.

In the accompanying drawings, Figure 1 is a side elevation of my improved meter. Fig. 2 is a vertical sectional view. Fig. 3 is a detached view of the top of the hopper. Fig 4 is a view of a modification. Figs. 5, 6, 7, and 8 are detail views, and Fig. 9 is a view in end elevation.

My improved meter may be applied to a thrashing-machine in any desired manner.

A represents a frame, to which a pair of uprights $a\ a$ are secured. A scale-beam B is pivotally connected at a point between its ends to the uprights $a\ a$, and on its free end $b$ an adjustable weight $c$ is supported, said end $b$ being adapted to pass through an elongated slot $c'$ in an arm $c^2$, secured to the frame A, and which forms a guide for said end $b$ in its movements. On the opposite end of the beam B a hopper C is pivotally supported. As shown in Figs. 1 and 2, this point of support is near the lower end of the hopper; but it may be supported near its upper end, if preferred, as shown in Fig. 4. As this point of support is at or near one end of the hopper, provision has to be made for the support of the opposite end. This conveniently consists of a bail D, hinged to the hopper at points $d\ d$ and pivotally connected at its ends to the uprights $a\ a$. Thus it will be seen that the hopper C is supported in line with its vertical axis at a point near its bottom and that it is supported in its proper upright position at a point near its top and out of line with the vertical axis.

The hopper C is divided into two compartments by a central partition $e$, and at the bottom of the hopper, in line with the lower end of said partition, perforated arms $f$ are secured to the hopper and made to depend slightly therefrom. In these perforated arms $f$ a crank-shaft E is mounted, the crank E' of said shaft being preferably provided with a roller $g$, the function of which will presently appear.

Secured to the crank-shaft E is a double valve F, adapted to alternately close the respective compartments of the hopper, said valve being preferably provided with flanges or wings $E^2$, adapted to lie parallel with the sides of the hopper and thus prevent lateral escape of grain. The upper end or inlet G of the hopper will be made detachable, being provided with spring-catches $g$ at opposite sides, adapted to engage suitable pins $g'$ on the main body of the hopper.

Mounted in the walls of the hopper C, at a point slightly below the cap or inlet G and parallel with the shaft E, is a crank-shaft H, the crank-arm H' of which is made smaller than the crank E' of shaft E and provided with a roller $E^3$.

Secured to the crank-shaft H is a cut-off I, adapted to control the flow of grain to one or the other of the compartments of the hopper, said cut-off being provided with flanges $H^3$ at its ends to prevent the lateral escape of grain.

The cap or inlet G is provided interiorly with flanges $h$, adapted to conduct the grain into one or the other of the compartments of the hopper. These flanges are adapted to overlap the flanges $H^3$ of the cut-off I and thus prevent the grain from escaping and choking the cut-off.

Pivotally connected to the hopper C at a point preferably below the center is a lever J, having an elongated slot $i$ at its upper end for the reception of the roller of the crank-shaft H and an elongated slot $i'$ at its lower end for the reception of the roller on the crank-arm of the shaft E. The lever J will preferably have secured to it a plate J', bowed at its center at the point where it passes the pivot-pin $j$ of the lever J, and at that point provided with a perforation to receive said pivot-pin. The free end of the pivot-pin $j$ is provided with a thumb-nut $j^2$, adapted to bear on the plate J' to a greater or less degree, according to the tension desired to effect a proper vibration of the hopper and movement of the valve and cut-off. The plate J' has journaled in its upper end a roller $k$, adapted to engage one or the other side of a stop or projection $l$, which projects downwardly from an arm K, secured to one of the uprights $a$.

The mechanism being constructed and arranged as above set forth, the weight $c$ will be adjusted as desired and the meter will be ready to receive grain. In the normal position of the meter one of the valves F will be closed and the other open, the cut-off I being set to direct grain to the compartment of the hopper, which is closed, and prevent the entrance of grain to the open compartment. Grain will flow into the closed compartment until sufficient has entered it to overbalance the weight $c$. The hopper will then move downwardly, owing to the weight of the grain therein, and release the plate or arm J' from the stop $l$.

The weight of the grain upon the closed valve F will now force said valve open and be discharged, at the same time turning the crank-shaft E and closing the other valve F to close the other compartment and causing the pivoted lever J to vibrate. During the vibration of the lever J the cut-off I will be shifted through the medium of its crank-shaft and grain made to enter the second compartment. When the grain shall have been discharged from the first compartment and during the operations above described, the hopper will rise (owing to the relief of the weight of the grain) and the roller in the free end of the arm J' made to engage the other edge of the stop $l$. When the second compartment shall have been filled to the proper extent, the movement of the parts will be reverse to that above described and the apparatus will continue to operate automatically as long as grain is permitted to enter the hopper C.

Instead of hanging the hopper C, as above set forth, the yoke or frame B may be connected thereto in proximity to its top and the bail D, connected to the uprights $a$ $a$, and hopper C at points near their lower ends, as shown in Fig. 4.

Instead of employing a bail, as D, arms 2 may be substituted, as shown in Fig. 5.

Instead of making the yoke B with a single arm or scale beam $b$, projecting rearwardly from the center, said yoke may be made with two arms or beams $b$, extending rearwardly from the yoke and in line therewith, as shown in Fig. 6, or, if desired, the yoke B may be provided with a single arm or beam $b$, extending rearwardly in line with one arm of the yoke or frame B, as shown in Fig. 8.

As shown in Fig. 4, the uprights $a$ $a$ may be secured at their upper ends to a chute 3, adapted to discharge grain into the hopper, and near their lower ends said uprights are connected with the chute by means of braces 4.

The valves F may, if desired, be made to operate within the hopper, as shown in Fig. 7, and the flanges of said valves made to enter shields secured to the inside of the hopper.

Having fully described my invention, what I claim as new, and desire to secure by Letters Patent, is—

1. The combination, with uprights, a rigid arm projecting laterally from one upright, said arm having a stop or projection thereon, of a scale-beam pivoted between the uprights, a hopper pivotally supported on the scale-beam, a bail pivotally connecting the uprights and the hopper, valve and cut-off pivoted to the opposite ends of the hopper, and a lever operatively connected with the valve and cut-off and adapted to be controlled by the stop, substantially as set forth.

2. The combination, with a pivoted hopper, valve mechanism, and a cut-off, of a lever pivoted to said hopper and connected at one end to the valve mechanism and at the other end to the cut-off, a plate secured to said lever, and a set-screw adapted to bear on said plate to regulate the tension of the pivoted lever, substantially as set forth.

3. The combination, with a pivoted hopper, of crank-shafts mounted in the top and bottom thereof, rollers carried by the cranks of said crank-shafts, a cut-off carried by one of said crank-shafts, valves carried by the other crank-shaft, a lever pivoted to the hopper and having slots in its ends to receive the rollers of the crank-shafts, a plate on the pivoted lever carrying a roller, and a stop with which said roller is adapted to engage, substantially as set forth.

4. The combination, with a suitable frame and uprights, of a yoke pivoted in said uprights, a scale-beam forming part of said yoke, a slotted plate through which said beam passes, a hopper pivoted in said yoke in line with the center of said hopper, and a bail pivotally connected to the hopper at the opposite side thereof from the uprights, said bail being pivotally connected to said uprights, substantially as set forth.

In testimony whereof I have signed this specification in the presence of two subscribing witnesses.

ALBERT J. NEVILLE.

Witnesses:
A. R. HAYNES,
J. C. ABBOTT.